United States Patent
Shin et al.

(10) Patent No.: US 10,144,821 B2
(45) Date of Patent: Dec. 4, 2018

(54) COMPOSITION COMPRISING GLASS FIBER AND TWO OR MORE TYPES OF RESIN

(71) Applicant: KOREA PALLET POOL CO., LTD., Seoul (KR)

(72) Inventors: Yang Jai Shin, Gyeonggi-do (KR); Yun Suk Cho, Gyeongsangnam-do (KR)

(73) Assignee: KOREA PALLET POOL CO., LTD., Seoul (KR)

( * ) Notice: Subject to any disclaimer, the term of this patent is extended or adjusted under 35 U.S.C. 154(b) by 136 days.

(21) Appl. No.: 15/111,130

(22) PCT Filed: Jul. 30, 2014

(86) PCT No.: PCT/KR2014/007007
§ 371 (c)(1),
(2) Date: Jul. 12, 2016

(87) PCT Pub. No.: WO2015/115710
PCT Pub. Date: Aug. 6, 2015

(65) Prior Publication Data
US 2016/0340503 A1   Nov. 24, 2016

(30) Foreign Application Priority Data
Jan. 29, 2014   (KR) .......................... 10-2014-0011170
Jul. 25, 2014   (KR) .......................... 10-2014-0094716

(51) Int. Cl.
*B29B 7/00* (2006.01)
*B29C 45/00* (2006.01)
(Continued)

(52) U.S. Cl.
CPC ............ *C08L 23/0807* (2013.01); *B29B 9/10* (2013.01); *B29C 45/0001* (2013.01); *C08J 5/04* (2013.01);
(Continued)

(58) Field of Classification Search
CPC ........ B29B 9/10; C08L 23/0807; C08L 23/04; C08L 23/06; C08L 23/12; B29C 45/0001; C08J 5/04
See application file for complete search history.

(56) References Cited

U.S. PATENT DOCUMENTS

| | | | |
|---|---|---|---|
| 6,271,270 B1 * | 8/2001 | Muzzy | B29B 17/0042 264/37.1 |
| 2003/0187102 A1 * | 10/2003 | Medoff | A01N 25/10 524/9 |
| 2006/0049541 A1 * | 3/2006 | Sutton | B29C 45/0005 264/148 |

FOREIGN PATENT DOCUMENTS

| JP | 2847300 | 1/1999 |
|---|---|---|
| KR | 10-2007-0098844 | 10/2007 |

(Continued)

OTHER PUBLICATIONS

International Search Report dated Oct. 28, 2014 for PCT/KR2014/007007.

*Primary Examiner* — Kelly M Gambetta
(74) *Attorney, Agent, or Firm* — Rabin & Berdo, P.C.

(57) ABSTRACT

Disclosed is a composition containing at least two types of resins and long glass fibers. The composition includes: a resin blend including at least two types of unit resins; long glass fibers having a length of 10 mm or more; and a rubber-based resin, wherein the long glass fibers and the rubber-based resin are used in an amount of 3-30 parts by weight and 0.5-25 parts by weight, respectively, based on 100 parts by weight of the resin blend.

3 Claims, 4 Drawing Sheets

(51) Int. Cl.
    *C08L 23/08*           (2006.01)
    *C08J 5/04*            (2006.01)
    *C08L 23/04*           (2006.01)
    *B29B 9/10*            (2006.01)
    *C08L 23/06*           (2006.01)
    *C08L 23/12*           (2006.01)
    *B29K 23/00*           (2006.01)
    *B29K 105/08*          (2006.01)
    *B29K 309/08*          (2006.01)

(52) U.S. Cl.
    CPC ............... *C08L 23/04* (2013.01); *C08L 23/06* (2013.01); *C08L 23/12* (2013.01); *B29K 2023/0633* (2013.01); *B29K 2023/12* (2013.01); *B29K 2105/08* (2013.01); *B29K 2309/08* (2013.01); *C08K 2201/004* (2013.01); *C08L 2207/066* (2013.01)

(56) References Cited

FOREIGN PATENT DOCUMENTS

KR     10-2011-0076341     7/2011
KR     10-1353815     1/2014

* cited by examiner

IMPACT STRENGTH

FLEXURAL STRENGTH

COMPOSITION COMPRISING GLASS FIBER AND TWO OR MORE TYPES OF RESIN

This application claims the priority of Korean Patent Application Nos. 10-2014-0011170, and 10-2014-0094716, filed on Jan. 29, 2014, and Jul. 25, 2014 in the KIPO (Korean Intellectual Property Office), the disclosure of which is incorporated herein entirely by reference. Further, this application is the National Stage application of International Application No. PCT/KR2014/007007, filed Jul. 30, 2014, which designates the United States and was published in Korean. Each of these applications is hereby incorporated by reference in their entirety into the present application.

TECHNICAL FIELD

The present disclosure relates to a composition including at least two types of resins and glass fibers. More particularly, the present disclosure relates to a composition including at least two types of resins and long glass fibers, the composition using long glass fibers in combination with waste resins that may undergo degradation of impact resistance and flexural properties when used as blend to improve the impact resistance and flexural properties for plastic products at the same time by virtue of the long glass fibers.

BACKGROUND ART

Since waste resins may be used as recycled raw materials, they are provided for reuse after collected separately, crushed and molten. However, because such waste resins based on polymers have different physical properties depending on their types, it is required to separate various types of waste resins precisely depending on their types so that waste resins may be recycled.

In general, waste resins are separated by using a difference in specific gravity. However, in the case of polyethylene (PE)/polypropylene (PP) having a specific gravity lower than that of water, such a way of separation is not adequate. When using such non-precisely separated resins having different physical properties in combination, compatibility between the resins is degraded and affinity of the resins to each other becomes insufficient, resulting in degradation of physical properties, such as impact resistance.

For example, Korean Utility Model No. 20-2001-24176 discloses a cost-efficient method for preparing a pallet using recycled plastics. However, the pallet recycled according to the above-mentioned related art is obtained by crushing waste resin materials and molding the crushed materials into the form of a pallet. In this case, there is a problem of degradation of impact resistance due to the low compatibility and affinity between heterogeneous waste resin materials.

DISCLOSURE OF THE INVENTION

Technical Problem

A technical problem to be solved by the present disclosure is to provide a composition including at least two types of waste resins and having improved physical properties, such as impact resistance and flexural strength, as well as a plastic product using the same.

Advantageous Effects

According to the embodiments of the present disclosure, at least two types of waste resins are used in combination with long glass fibers that are glass fibers having at least a predetermined length so that the waste resins are bound with the long glass fibers. In this manner, it is possible to improve the physical affinity of the resins to each other and flexural properties, and to improve impact resistance and compatibility significantly by using a rubber-based resin. In addition, an olefin-based rubber resin is used when the waste resins are recycled, thereby improving the resin phase dispersibility of the long glass fibers in the waste resins including polyethylene.

Further, it is possible to solve the problem of precipitation of a rubber-based resin on the surface and to overcome the problem of generation of odor caused by the carbonization of a rubber-based resin.

MODE FOR CARRYING OUT THE INVENTION

Figure 1:
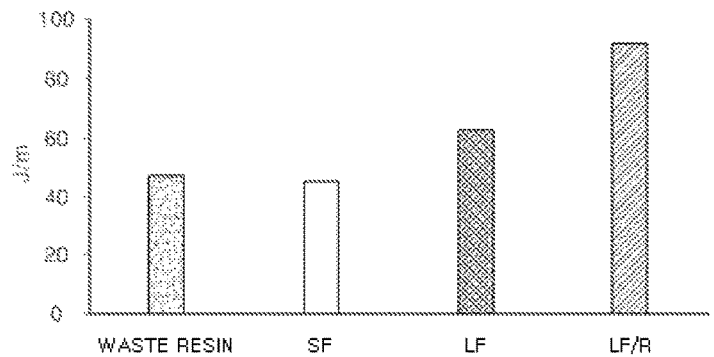
FIG. 1 and FIG. 2 each show the results of measurement of impact resistance and flexural strength for the molded bodies (pallets) obtained by mixing long glass fibers having a different length with a resin blend containing polypropylene (PP) and polyethylene (PE) at a ratio of 5:5 or 2:8, followed by melting and molding, according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. In the drawings, the width, length, thickness, and the like, of a constitutional part may be exaggerated for clarity. Throughout the specification, like reference numerals denote like elements. In addition, unless otherwise defined, all abbreviations used herein have the same meaning as commonly understood by one of ordinary skill in the art.

To solve the above-mentioned problem, in one aspect, there is provided a composition including a blended material of at least two types of waste resins in combination with long glass fibers that are glass fibers having at least a predetermined length (10 mm or more).

According to an embodiment, the resins of the waste resins are polyethylene (PE) and polypropylene (PP) having a specific gravity lower than that of water. The two types of resins are waste resins discarded after use. While the composition according to the present disclosure uses at least two types of waste resins having such a different structure, different physical properties and a different molecular weight, it solves the problems relates with degradation of compatibility caused by the simultaneous use of such two types or more of waste resins, in other words, degradation of brittleness, poor impact resistance and degradation of flexural strength, by using long glass fibers having at least a predetermined length and a rubber-based resin.

The composition according to an embodiment of the present disclosure is one for use in preparation of a plastic molded body, such as pallet, and includes a resin blend containing at least two types of unit resins, long glass fibers having a length of 10 mm or more, and a rubber-based resin.

According to another embodiment, the resin blend includes unit resins of waste polyethylene (PE) and waste polypropylene (PP) and the molecular weight of each unit resin conforms to the general molecular weight of PE or PP. In addition, the unit resins of the resin blend have a specific gravity less than 1. It is difficult to separate PE and PP from each other through a conventional method for separating waste resins using a difference in specific gravity from that of water. When using such a resin blend, compatibility between the resins and chemical binding force are degraded due to a different chain length, structure, branch shape, or the like. As a result, a molded body obtained from the resin blend may be broken with ease by the impact applied from the exterior.

However, according to the present disclosure, long glass fibers having a predetermined length are mixed physically with the resin blend before melting, and then the resultant mixture is molten so that the long glass fibers may function as a kind of backbone to which the unit resins of the resin blend are bound. As a result, such different types of unit resins are bound to the long glass fibers and the long glass fibers function as linker by which the two types of unit resins are linked to each other.

Particularly, the inventors of the present disclosure have focused on the long glass fibers that function to link different types of waste resins to each other and provide a different effect depending on length. In addition, when using a rubber-based resin, such as SBR, EPDM, SEBS or SBS, it is possible to improve impact resistance significantly while maintaining flexural strength.

According to still another embodiment, the glass fibers having a length of 10 mm or more and the rubber-based resin may be used in an amount of 3-30 parts by weight and 0.5-30 parts by weight, respectively, based on 100 parts by weight of the resin blend. The long glass fibers according to an embodiment are those obtained by drawing and winding molten glass at a high speed. Commercially available long glass fibers are those having a length of 10 mm or more.

When the long glass fibers are mixed in an amount less than the above-defined range, the long glass fibers that link the unit resins to each other have a decreased effective length, and thus may not be bound chemically to the unit resins sufficiently, thereby providing an insufficient effect of improving affinity. On the contrary, when the long glass fibers are used in an amount larger than the above-defined range, the proportion of the resins actually forming a molded body is reduced excessively, thereby providing poor moldability and overweight.

In addition, when the rubber-based resin contained in the composition is mixed in an amount less than the above-defined range, impact resistance may be degraded. When the rubber-based resin is used in an amount larger than the above-defined range, moldability and flexural strength of the resins may be degraded.

According to still another embodiment, the rubber-based resin may be an olefinic rubber-based resin. The inventors of the present disclosure have found that use of a non-olefinic rubber-based resin, such as conventional SBS or SEBS, in a melting process performed during the preparation of a plastic product using a waste resin causes thermal carbonization (generation of a carbonized product and odor) in the rubber-based resin, and leads to the problems of agglomeration of rubber-based resin, low dispersibility and precipitation on the surface due to a high decomposition rate during the melting process. To solve the above-mentioned problems, an olefinic rubber-based resin is used for the composition to inhibit agglomeration of the rubber-based resin during the melting of the waste resins and to reduce the odor generated during the carbonization. The effects provided by the use of an olefinic rubber-based resin will be explained in the following Test Examples in more detail.

In another aspect, there is provided a composition including a blend containing at least two types of waste resins in combination with long glass fibers that are glass fibers having a predetermined length (10 mm or more), and a rubber-based resin to which LDPE are added.

The composition according to an embodiment of the present disclosure is one for use in preparation of a plastic molded body, such as pallet, and includes a resin blend containing at least two types of unit resins, glass fibers having a length of 10 mm or more, and a rubber-based resin containing LDPE (density: 0.915-0.925 g/cm$^3$, weight average molecular weight: 1,000,000 or more). Particularly, when long glass fibers are mixed with a molten resin, there is a problem in that the long glass fibers show decreased dispersibility, thereby making it difficult for the resultant plastic product to accomplish uniform strength. To solve the above-mentioned problem, LDPE having a large amount of side branches is incorporated preliminarily to the rubber-based resin and then the rubber-based resin is mixed with a resin blend containing at least two types of waste resins. LDPE mixed with the rubber-based resin improves the dispersibility of the long glass fibers, resulting in improvement of the strength of the finished plastic product. The effect of improvement of the dispersibility of long glass fibers provided by the use of a LDPE-containing rubber-based resin will be explained in the following Test Examples in more detail. According to an embodiment, the rubber-based resin may be a non-olefinic resin, such as SBR, EPDM, SEBS or SBS, or an olefinic rubber-based resin, such as ethylene-butene copolymer. However, the rubber-based resin may be an olefinic resin in order to prevent odor generation or precipitation of the rubber-based resin on the surface.

According to another embodiment, the resin blend may include unit resins of waste polyethylene (PE) and waste polypropylene (PP) as described above. When using such waste resins having a similar level of specific gravity in combination, the same problems as described above may occur.

According to still another embodiment, the long glass fibers having a length of 10 mm or more, the LDPE-containing rubber-based resin, and LDPE may be used in an amount of 3-30 parts by weight, 0.5-25 parts by weight, and 5-35 parts by weight, respectively, based on 100 parts by weight of the resin blend.

When using LDPE in an amount less than the above-defined range, the dispersibility of long glass fibers may be degraded, resulting in non-uniformity of strength. When using LDPE in an amount larger than the above-defined range, it is not possible for the rubber-based resin to provide a sufficient effect for improving impact resistance. In addition, when the long glass fibers are used in an amount less than the above-defined range, the long glass fibers that link the unit resins to each other have a decreased effective length, and thus may not be bound chemically to the unit resins sufficiently, thereby providing an insufficient effect of improving affinity. On the contrary, when the long glass fibers are used in an amount larger than the above-defined range, the proportion of the resins actually forming a molded body is reduced excessively, thereby providing poor moldability and overweight. Further, when the rubber-based resin is used in an amount less than the above-defined range, impact resistance may be degraded. When the rubber-based resin is used in an amount larger than the above-defined range, the moldability and flexural strength of the resins may be degraded.

In still another aspect, there is provided a plastic product having improved strength and flexural strength by using the composition having the above-mentioned effects. For example, the composition according to the present disclosure may be applied to various types of products, such as pallets, crates or boxes, which have to resist a predetermined extent of load of goods stacked thereon. Such types of products fall within the scope of the present disclosure.

Test Example 1

Figure 2:
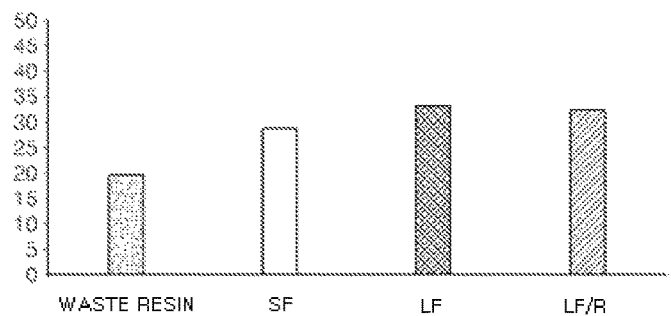

FIG. 1 and FIG. 2 each show the results of measurement of impact resistance and flexural strength for the molded bodies (pallets) obtained by mixing long glass fibers (10 parts by weight) having a different length with a resin blend containing polypropylene (PP) and polyethylene (PE) at a ratio of 5:5 to 9:1, followed by melting and molding, according to an embodiment.

In FIG. 1 and FIG. 2, 'WASTE RESIN' corresponds to the sample using no long glass fibers, 'SF' corresponds to the sample using short glass fibers having a length of 1 mm or less, 'LF' corresponds to the sample using long glass fibers having a length of 10 mm or more, and 'LF/R' corresponds to the sample using long glass fibers having a length of 10 mm or more in combination with a rubber-based resin.

Referring to FIG. 1 and FIG. 2, when using short glass fibers, it can be seen that flexural strength is increased slightly as compared to the sample using no long glass fibers but impact strength is decreased. However, when using long glass fibers having a length of 10 mm or more, it can be seen that both flexural strength and impact strength are increased significantly.

Test Example 2

To a resin blend containing PP and PE at a ratio (weight ratio) of 5:5 to 2:8 according to an embodiment, long glass fibers (10 parts by weight) and ethylene-butene copolymer (average molecular weight 2000, 10 parts by weight) as olefinic rubber-based resin are added. Then, the resultant mixture is molten to obtain a pallet (Example). On the contrary, SBS are added instead of the olefinic resin in the same amount as the olefinic resin to obtain a pallet (Comparative Example) in the same manner as Example 1.

The following Table 1 shows the results obtained by the sensual evaluation of three panels for the pallets according to Example and Comparative Example, after the pallets are allowed to stand in a closed room for 10 hours.

TABLE 1

|  | Example | Comparative Example |
| --- | --- | --- |
| Panel 1 | No odor | Odor |
| Panel 2 | No odor | Odor |
| Panel 3 | No odor | Odor |

As can be seen from the above test results, when using an olefinic rubber-based resin for remelting of waste resins according to the present disclosure, it is possible to inhibit generation of odors caused by the carbonization of rubber.

Test Example 3

Figure 3:
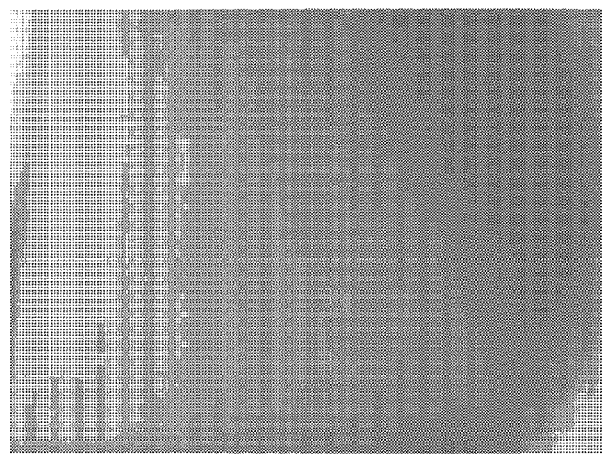
FIG. 3 and FIG. 4 show the images of the pallet surfaces according to Example and Comparative Example.
Figure 4:
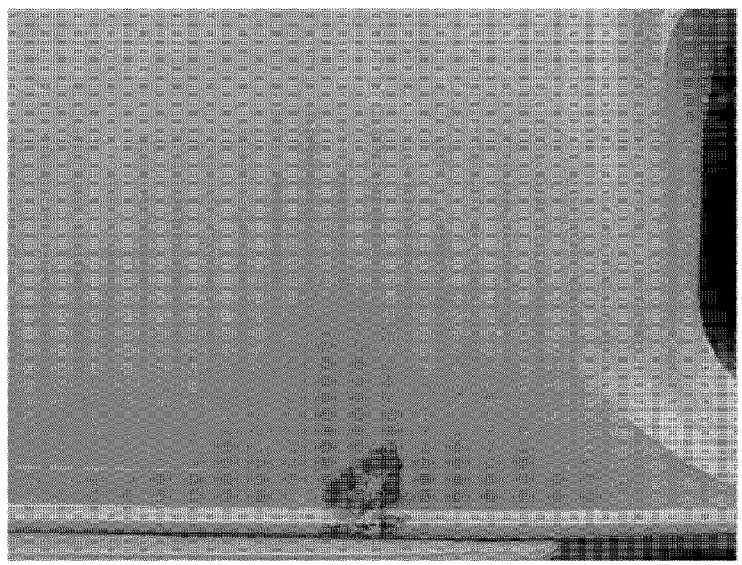

FIG. 3 and FIG. 4 show the surface image of Example and that of Comparative Example, respectively.

Referring to FIG. 3 and FIG. 4, when using an olefinic resin according to an embodiment, agglomeration of a rubber-based resin in the molten waste resins is inhibited by virtue of a low decomposition rate, and thus no rubber-based resin is deposited in the form of black precipitate on the surface of the finished pallet.

Test Example 4

According to an embodiment, a pellet-like rubber-based resin (ethylene-butene copolymer, 10 parts by weight) containing LDPE (5 parts by weight) is mixed with a resin blend and long glass fibers, followed by melting. Particularly, the inventors of the present disclosure unexpectedly have found that when using a rubber-based resin containing LDPE, dispersibility of long glass fibers in the resin blend is improved significantly.

Figure 5:
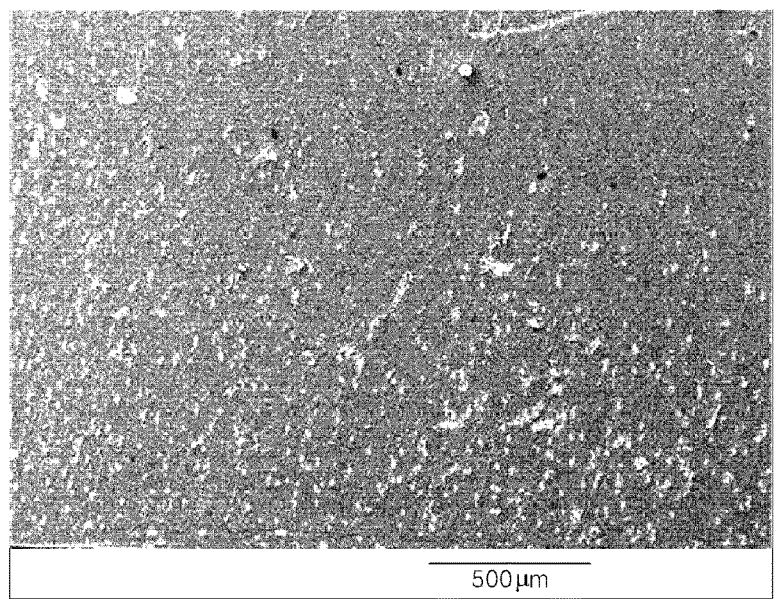
FIG. 5 and FIG. 6 show the scanning electron microscopic (SEM) images of compositions using a rubber-based resin alone, after molding.
Figure 6:
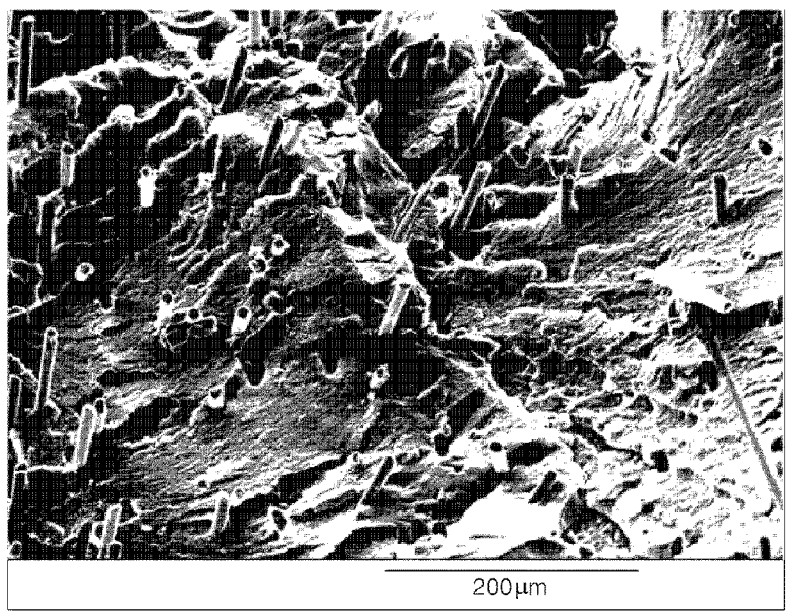
Figure 7:
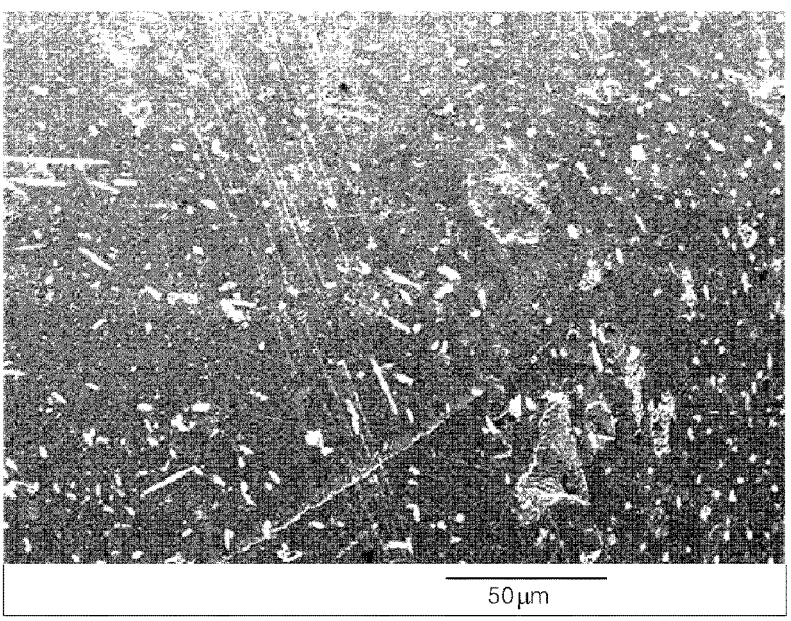
FIG. 7 and FIG. 8 show the SEM images of compositions using a rubber-based resin containing low-density polyethylene (LDPE), after molding.
Figure 8:
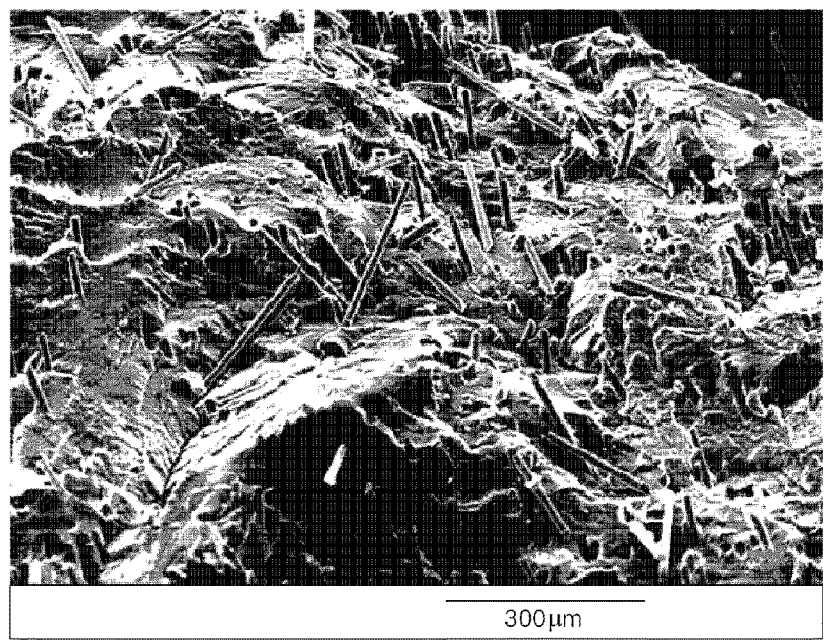

FIG. 5 and FIG. 6 show the scanning electron microscopic (SEM) images of compositions using a rubber-based resin alone, after molding, and FIG. 7 and FIG. 8 show the SEM images of compositions using a rubber-based resin containing LDPE, after molding.

Referring to FIG. 5 to FIG. 8, it can be seen that when adding a rubber-based resin alone to a molten resin, long glass fibers are not uniformly dispersed on the whole (see, FIG. 5), resulting in formation of voids on the section (see, FIG. 6). However, it can be seen that when adding a LDPE-containing rubber-based resin to a molten resin in the form of pellets, long glass fibers are uniformly dispersed (see, FIG. 7) and a relatively small amount of voids are formed in the composition (see, FIG. 8).

It can be seen from the above results that the long glass fibers added in combination with the LDPE-containing rubber-based resin are dispersed uniformly in the resin, thereby providing an effect of improving both impact strength and flexural strength.

Test Example 5

The following Table 2 shows the results of measurement of impact strength and flexural strength for the composition to which LDPE is added or the composition using a rubber-based resin and long glass fibers without addition of LDPE. In this Test Example, the long glass fibers are used in an amount of 15 parts by weight based on 100 parts by weight of a resin blend (polypropylene and polyethylene) and the rubber-based resin is used in an amount of 10 parts by weight. In addition, LDPE is used in an amount of 10 parts by weight.

TABLE 2

|  | No addition of LDPE | Addition of LDPE |
| --- | --- | --- |
| Impact strength | 80 | 92 |
| Flexural strength | 33 | 32 |

Referring to the above results, it can be seen that the impact strength of the resin is increased significantly. It is thought that this is because the dispersibility of the long glass fibers is improved and thus a dense structure is formed.

Figure 9:
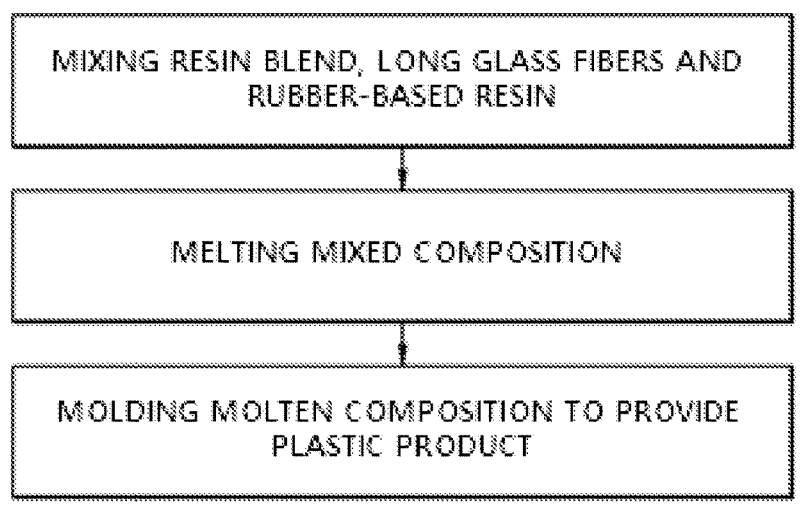
FIG. 9 is a flow chart illustrating the method for preparing a plastic product according to an embodiment.

FIG. 9 is a flow chart illustrating the method for preparing a plastic product according to an embodiment.

Referring to FIG. 9, the above-mentioned resin blend and long glass fibers are mixed with the rubber-based resin optionally containing LDPE to provide the composition. Herein, LDPE is incorporated to the pellet-like rubber-based resin, which, in turn, is mixed with the resin blend. As described above, the dispersibility of the long glass fibers is improved significantly depending on the use of LDPE. In addition, when the rubber-based resin optionally containing LDPE is an olefinic rubber-based resin, it is possible to inhibit precipitation of the rubber-based resin on the surface of a plastic product and generation of odor caused by carbonization.

Then, the resultant composition is molten and the molten composition is molded to provide a plastic product. According to an embodiment, the molding may be injection molding but the scope of the present disclosure is not limited thereto.

As can be seen from the foregoing, according to an embodiment of the present disclosure, waste resins having different structures and physical properties are linked to each other through long glass fibers having a predetermined length, thereby improving the affinity and compatibility between the unit resins. In addition, a rubber-based resin is used to improve impact resistance and flexural properties significantly. Further, a rubber-based resin containing LDPE added thereto is used to allow for LDPE having high compatibility in the PE resin of the waste resins and containing short side branches to fix the long glass fibers so that the dispersibility thereof may be improved. As a result, it is possible to maximize the effect of reinforcing strength provided by the long glass fibers. In addition, a rubber-based resin containing LDPE added thereto is mixed with at least two types of waste resins in the form of pellets, and thus it is possible to solve the problem of precipitation of the rubber-based resin that migrates toward the surface.

While the exemplary embodiments have been shown and described, it will be understood by those skilled in the art that various changes in form and details may be made thereto without departing from the scope of this disclosure as defined by the appended claims. Therefore, the above-described exemplary embodiments are for illustrative purposes only and not intended to limit the scope of the present disclosure. It is intended that the scope of the present disclosure includes all embodiments falling within the spirit and scope of the appended claims.

The invention claimed is:

1. A composition containing at least two types of resins and long glass fibers comprising:
    a resin blend comprising waste polyethylene (PE) and waste polypropylene (PP);
    long glass fibers having a length of 10 mm or more;
    an olefinic rubber-based resin; and
    an LDPE incorporated in the olefinic rubber-based resin in pellet form,
    wherein the long glass fibers and the olefinic rubber-based resin and the LDPE are used in an amount of 3-30 parts by weight and 0.5-25 parts by weight, and 5-35 parts by weight, respectively, based on 100 parts by weight of the resin blend,
    and wherein the LDPE is incorporated in the olefinic rubber-based resin in the form of pellets, and then is incorporated into the composition.

2. A plastic product comprising a composition of claim 1.

3. A method for preparing a plastic product comprising the steps of:
    providing the composition of claim 1;
    melting the composition; and
    molding the molten composition to provide a plastic product.

* * * * *